March 17, 1953 — F. A. DE WIESS — 2,631,704
CONTROL LOCK
Filed Jan. 14, 1950 — 6 Sheets-Sheet 2
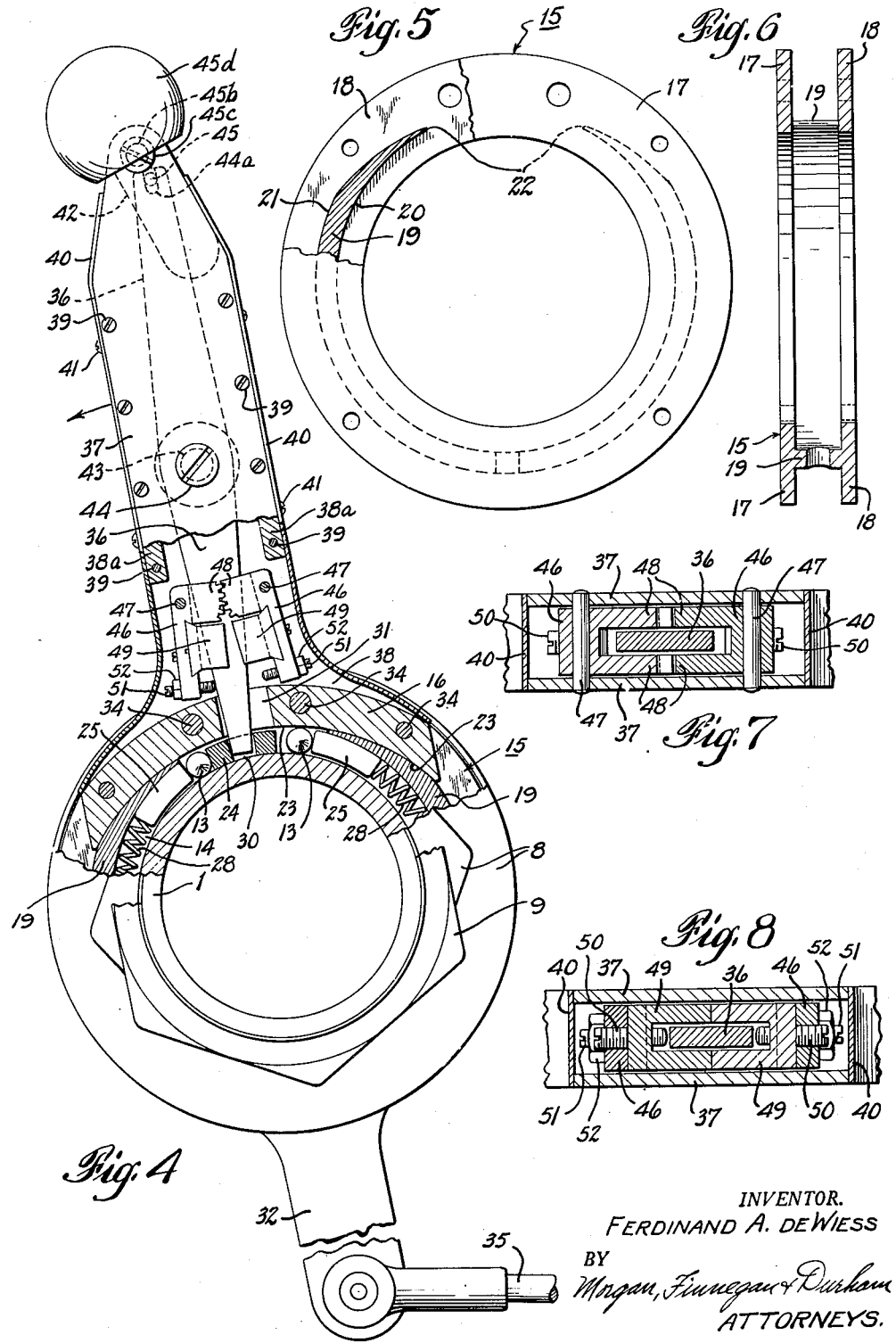
INVENTOR.
FERDINAND A. DE WIESS
BY Morgan, Finnegan & Durham
ATTORNEYS.

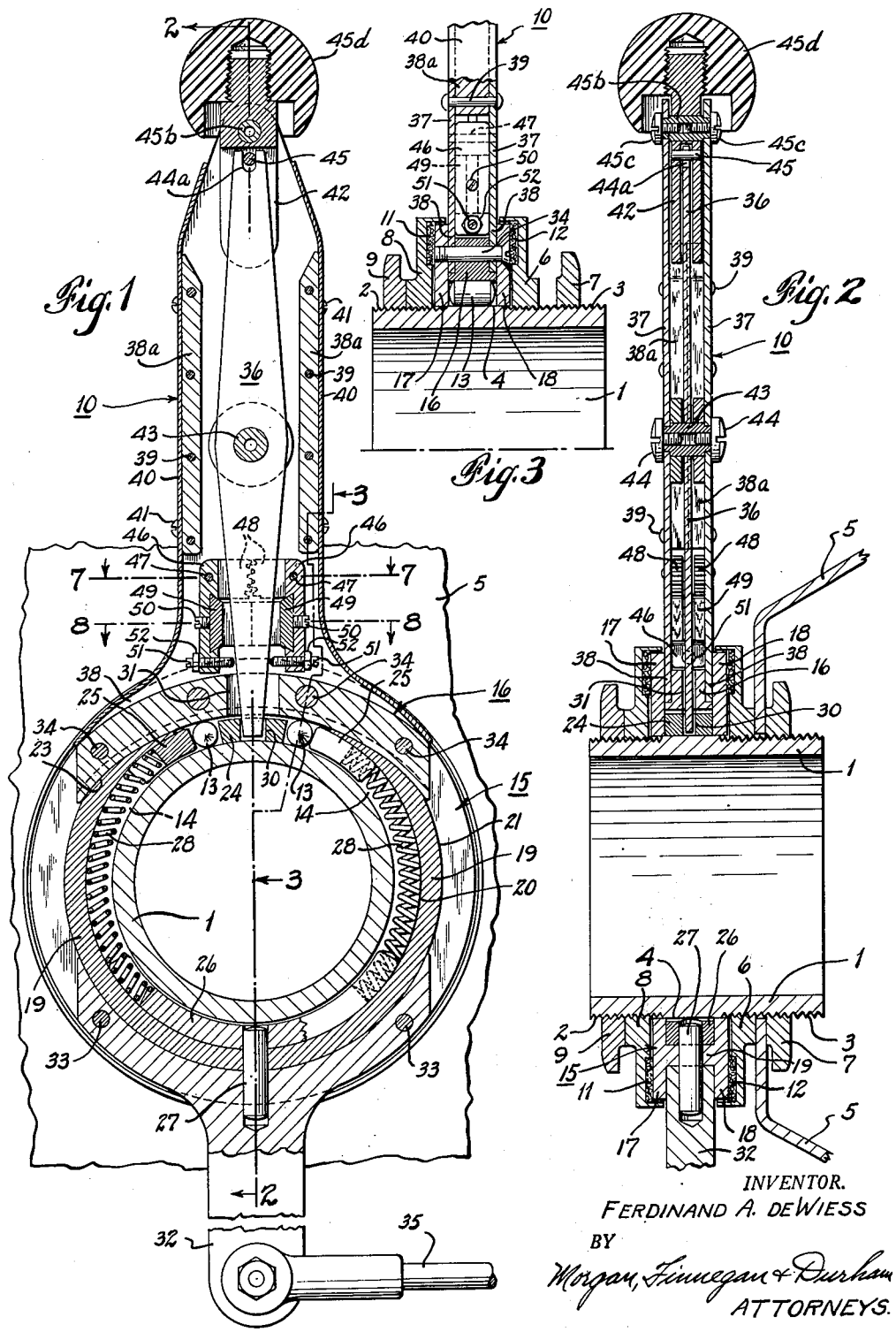

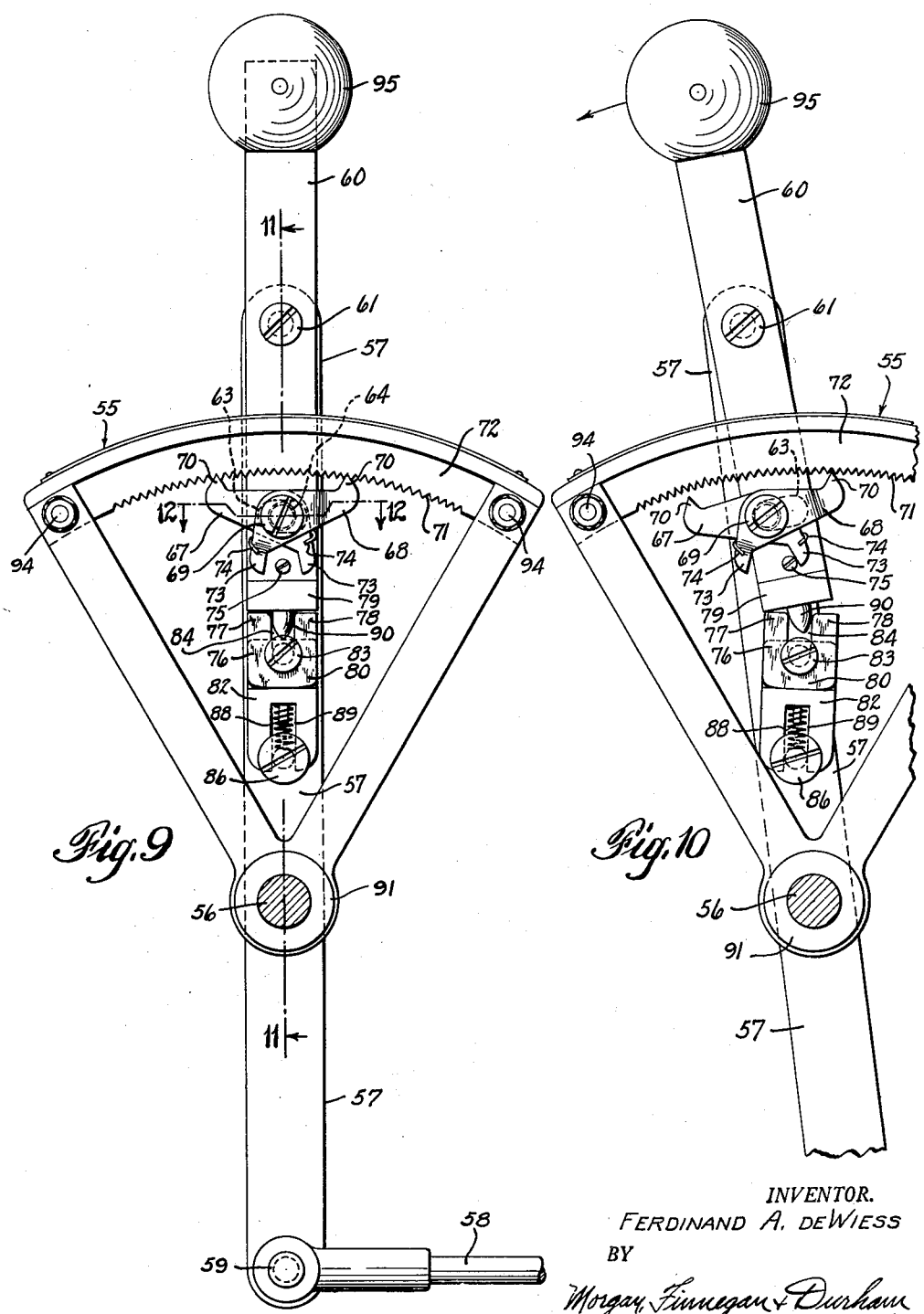

March 17, 1953　　　　F. A. DE WIESS　　　　2,631,704
CONTROL LOCK
Filed Jan. 14, 1950　　　　　　　　　　　　　6 Sheets-Sheet 4
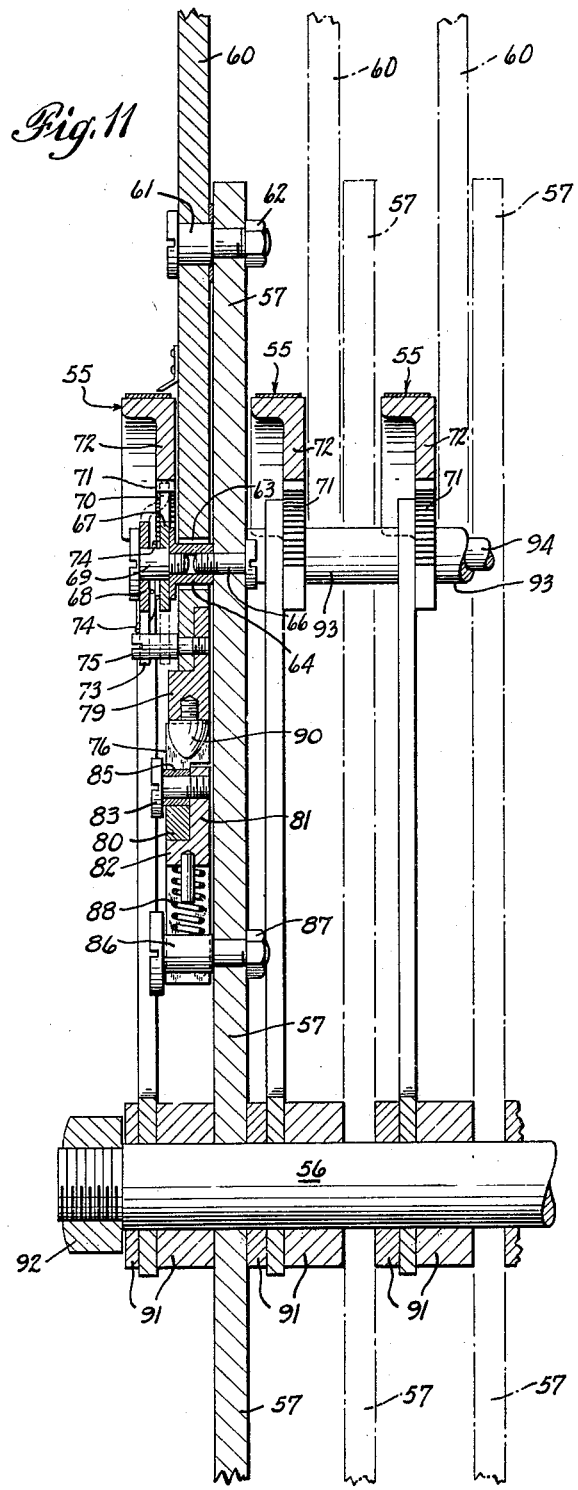
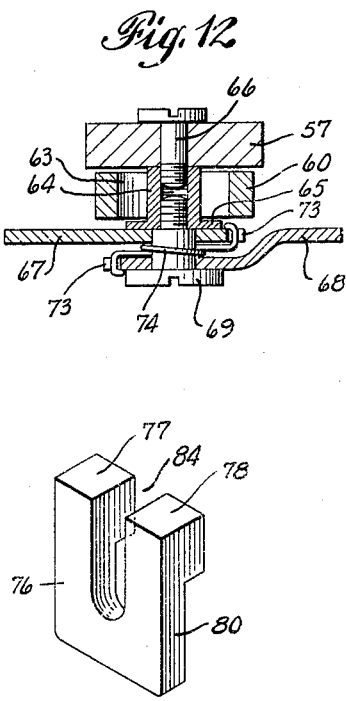
INVENTOR.
FERDINAND A. DEWIESS
BY
Morgan, Finnegan & Durham
ATTORNEYS.

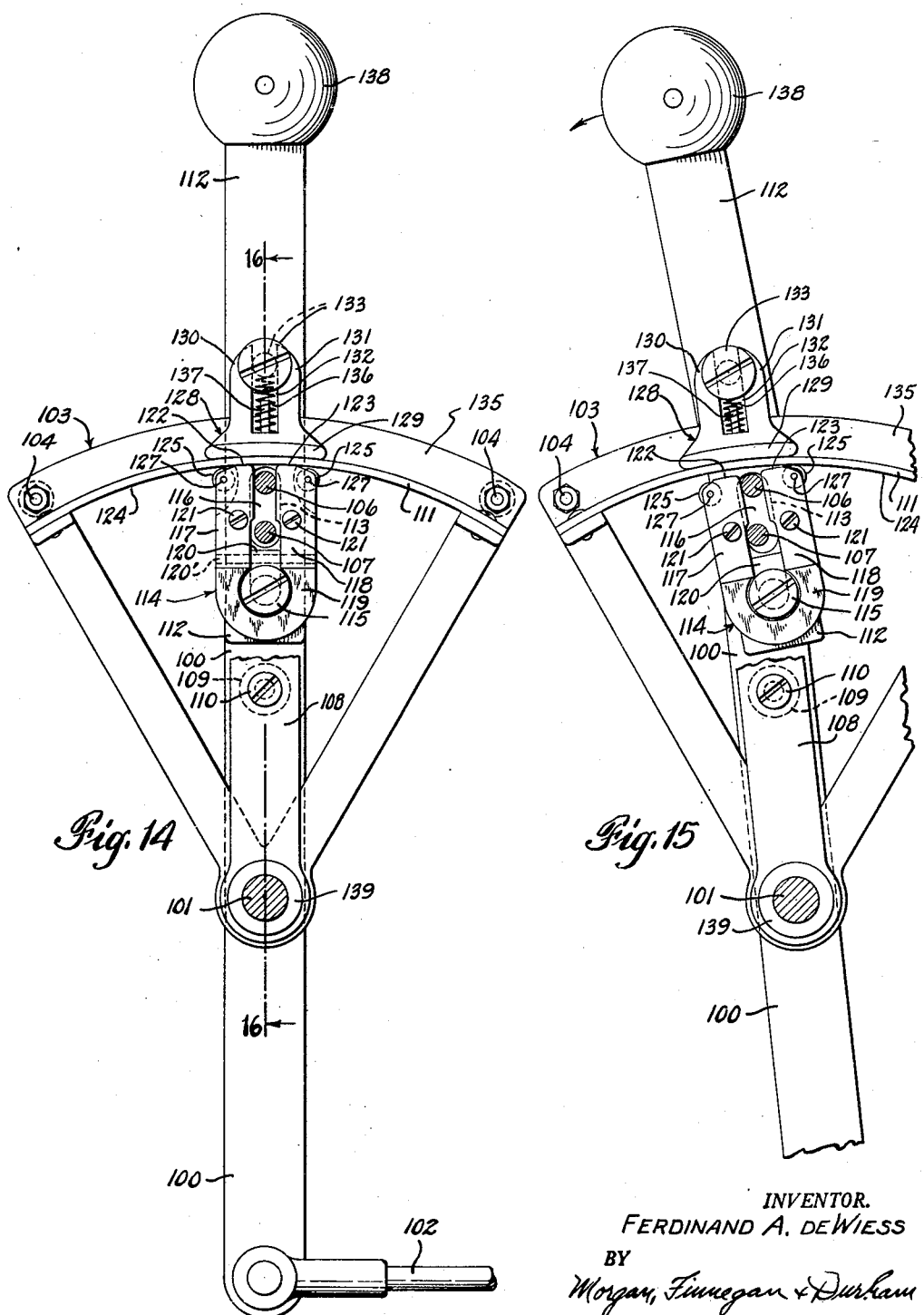

March 17, 1953  F. A. DE WIESS  2,631,704
CONTROL LOCK
Filed Jan. 14, 1950  6 Sheets-Sheet 6

INVENTOR.
FERDINAND A. deWIESS
BY
Morgan, Finnegan & Durham
ATTORNEYS.

Patented Mar. 17, 1953

2,631,704

UNITED STATES PATENT OFFICE 2,631,704

CONTROL LOCK

Ferdinand A. de Wiess, New York, N. Y.

Application January 14, 1950, Serial No. 138,599

21 Claims. (Cl. 192—8)

This invention relates to locking devices and is illustrated as embodied in a manually adjustable control device such, for example, as may be used as an aircraft throttle control and in which a positionally adjustable element is adapted to be set in a selected position relative to a second element and to be releasably locked thereto so as to resist "creep" of one element relative to the other under the influence of vibratory forces to which the device may be subjected in an aircraft, or other vehicle, or system in which it may be installed.

Known locking devices for throttle controls, flaps and, in general, for devices having such a positionable element, suffer from the defect that under the influence of random external vibratory forces, the device in whole or in part, is frequently set in sympathetic vibration engendering "creep" of the positionable element from the set position. Such creep may lead to disastrous results. This is particularly true in respect of devices of this character for use in aircraft, under conditions where the maintaining of a precise setting of the positionable element is a prime consideration. Various means have been suggested for overcoming this difficulty but, so far as is known, have been unsuccessful. In general, they have been sought to employ locking mechanisms embodying spring-pressed elements which, by reason of their being constituted by a combination of elastic members and free masses, are characterized by their capacity to enter into harmonic response to those frequencies in random vibrations which correspond to their own natural fundamental and/or harmonic frequencies, with inevitable failure at this point of the locking mechanism to maintain the given setting.

Accordingly, it is an object of this invention to provide an improved locking device having no system of elastic members and free masses in the locking mechanism and in which relative movement of the locked elements under the influence of random external vibratory forces is wholly prevented. To this end, and in accordance with features of this invention, the illustrated control device comprises a pair of members, which are mounted for relative movement. Means are provided for releasably locking these members together, the embodied locking means comprising a lock release member which is mounted on one member of the pair for displacement relative thereto between a selected equilibrium position in which the pair of members are locked together and a displaced position to one side or the other of the equilibrium position, in which the pair of members are unlocked and are relatively movable.

In accordance with this invention, moreover, the locking means as illustrated comprises additionally magnetic means carried by one member of the pair for restoring the lock release member to the selected equilibrium position when it is displaced therefrom, and for holding the lock release lever in that position, by the coercive force of its magnetic field, against displacement tending to result from the application of random external vibratory forces thereto. Thus, the lock release member is displaceable to free the pair of members for relative movement only on the application thereto of an external displacement force of determined magnitude and direction.

Although the coercive force of the magnetic field will ordinarily suffice to restore the lock release member to its equilibrium position following removal of the displacement force, the displacement may of occasion be beyond the limits of the range wherein the coercive force is sufficient in itself to achieve this result. Hence, the locking means may, as illustrated, also include means energized by displacement of the clutch release member to assist in restoring the latter to a position where the force of the magnetic field is sufficient to return the latter to its equilibrium position.

These and other features of the invention which will be pointed out in the claims and described in the specification are illustrated in the accompanying drawings, in which:

Fig. 1 is a partly broken view in vertical section of a manually adjustable control device, having as a pair of angularly displaceable members, a stationary shaft and an arm adjustably journalled thereon and having embodied therein novel locking mechanism constructed in accordance with the present invention, the view showing the parts as they would appear with the locking mechanism in locked equilibrium position;

Fig. 2 is a view in section taken along the line 2—2 of Fig. 1;

Fig. 3 is a fragmentary view in section taken along the line 3—3 of Fig. 1;

Fig. 4 is a view in side elevation with parts in section of the device of Fig. 1, showing the position of parts as they would appear in a released unstable position of the locking mechanism with the adjustable arm in counterclockwise motion as viewed in Fig. 4;

Fig. 5 is a part sectional view in side elevation with parts broken away, of a detail of the locking mechanism of the device of Fig. 1;

Fig. 6 is a view in section taken along the line 6—6 of Fig. 5;

Fig. 7 is a view in section taken along the line 7—7 of Fig. 1;

Fig. 8 is a view in section taken along the line 8—8 of Fig. 1;

Figure 16:
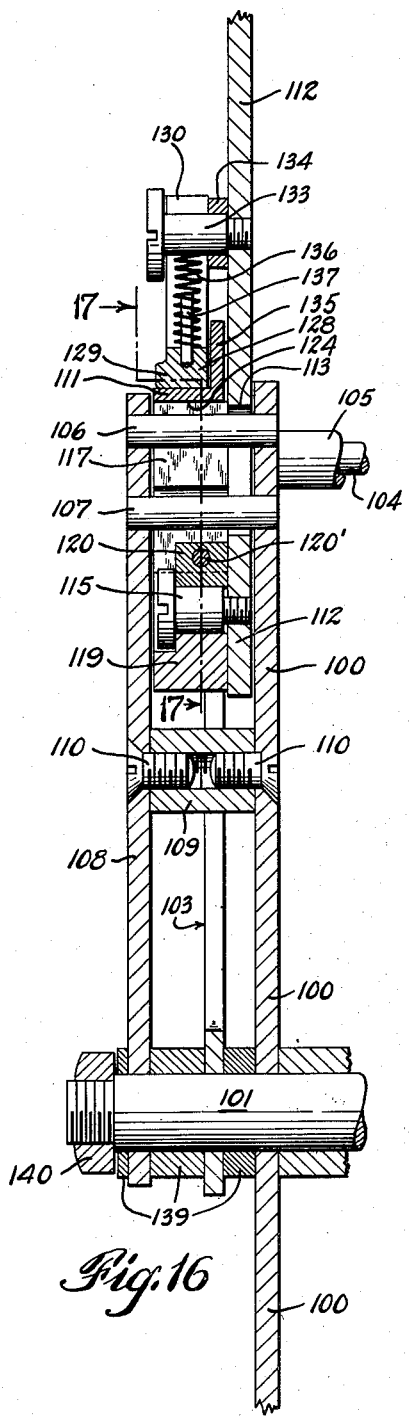
Figure 17:
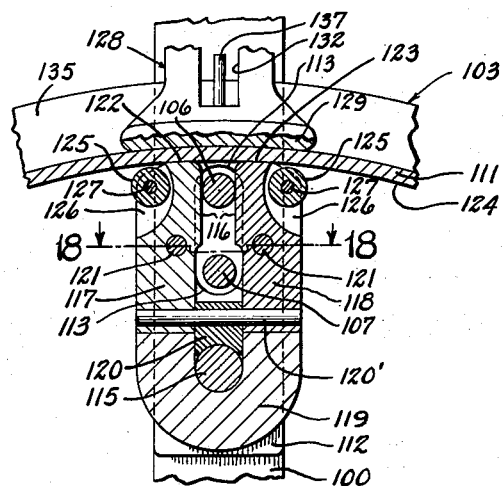
Figure 18:
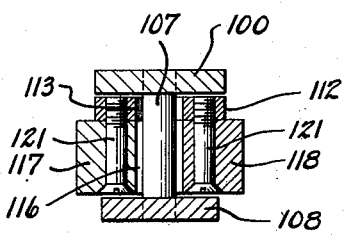

Fig. 9 is a view in elevation of the first unit of a set of manually adjustable control devices indicated in Fig. 11, each having, as a pair of angularly displaceable members, a stationary quadrant and an arm adjustably journalled thereto, and having embodied therein a modified form of novel locking means constructed in accordance with the present invention, the view showing the parts as they would appear with the locking mechanism in locked equilibrium position;

Fig. 10 is a view corresponding to Fig. 9 but with the adjustable arm in counterclockwise motion as view in Fig. 10 to show the position of the parts as they would appear in a released unstable position of the locking mechanism;

Fig. 11 is a view in section taken along the line 11—11 of Fig. 9 showing the manner in which several units are combined into a set having a common axis of rotation for the adjustable arms, of which the second and third arms of the three set unit shown are shown in dash-dot lines for clarity;

Fig. 12 is a view in section taken along the line 12—12 of Fig. 9;

Fig. 13 is a perspective view of the permanent magnet embodied in the device of Fig. 9;

Fig. 14 is a view in elevation with parts broken away of a quadrant type control device having embodied therein another modified form of novel locking means constructed in accordance with the present invention, the view showing the parts as they would appear with the locking mechanism in a locked equilibrium position;

Fig. 15 is a view corresponding to Fig. 14 but with the adjustable arm in counterclockwise motion as viewed in Fig. 15 to show the position of the parts as they would appear in a released unstable position of the locking mechanism;

Fig. 16 is a view in section taken along the line 16—16 of Fig. 14;

Fig. 17 is a fragmentary view in section taken along the line 17—17 of Fig. 16; and Fig. 18 is a view is section taken along the line 18—18 of Fig. 17.

Referring now more particularly to the embodiment of this invention illustrated in Figs. 1 to 8, inclusive, a hollow cylindrical shaft 1 having threaded end portions 2 and 3 separated by a cylindrical bearing portion 4, is removably secured to a support member 5. Advantageously, the support member 5 may be apertured to receive the threaded end portion 3 on which a bearing nut 6 and a lock nut 7 are threadedly received for securing the shaft 1 fixedly to the support, as shown. A corresponding bearing nut 8 threadedly engages the threaded end portion 2 and is secured in place by a lock nut 9.

A control arm 10 is journalled on the bearing portion 4 between the bearing nuts 6 and 8 which latter hold the arm against axial displacement in either direction on the fixed shaft 1. Advantageously, the respective inner faces of the bearing nuts 6 and 8 are each suitably recessed to receive annular anti-friction thrust washers 11 and 12, respectively.

Means are provided for releasably locking the control arm 10 to the shaft 1. To this end, a set of locking rollers 13 is disposed in an annular raceway 14 formed by and between an inner race constituted by the bearing portion 4 of the shaft 1 and an outer race formed by an annular collar 15 in conjunction with a wedge block 16.

The collar 15 is circumferentially recessed to provide parallel annular rim portions 17 and 18 and an annular connecting web portion 19 having inner and outer coaxial surface portions 20 and 21, respectively. The web portion 19 is radially apertured to provide an opening 22 at its top (as viewed in Fig. 5) for the passage of a lock release lever 36 therethrough. The inner surface portion 20 is of cylindrical contour throughout its length, as is the major portion of the outer surface portion 21. Advantageously, however, the contour of the latter is modified over a short distance at each side of the opening 22 to provide for a matching contour with an inner surface portion 23 of the wedge block 16.

The wedge block 16 is suitably dimensioned as to width to be received substantially snugly within the outer circumferentially recessed portion of the collar 15 against the web portion 19 and between the rim portions 17 and 18 in overlying relation to the web opening 22. The inner surface portion 23 of the wedge block is of cylindrical contour and of greater radius of curvature than the inner surface portion 20 of the collar 15. When secured in place it intersects the arc of the inner surface portion 20 substantially at the limits of the opening 22 and completes the raceway. Thus, the raceway 14 is narrowest at the centerline of the collar opening 22 from which it expands in opposite directions to reach its maximum and subsequently uniform width substantially at the limits of the opening 22.

The locking rollers 13, of which two are here preferably employed, are of a diameter corresponding substantially to the maximum width of the raceway and of a length corresponding substantially to the spacing between the rim portions 17 and 18. A roller release block 24 is disposed between the rollers 13 in free sliding engagement with the rim portions 17 and 18 of the collar 15 and with the shaft 1 but just out of contact with the rollers 13 in the equilibrium position shown in Fig. 1. The rollers 13 are normally held in the tapered portion of the raceway by means of a pair of keeper members 25 each disposed in the raceway in spring-pressed engagement with one of the rollers so as to hold the latter in the clutching position shown in Fig. 1. To this end, an arcute spacing block 26 is disposed in the raceway diametrically opposite the wedge block 16 and is secured midway of its ends to the collar 15 by means of a pin 27. A pair of coil springs 28 disposed in the raceway extend each from separate ends of the spacing block 26 to the separate keeper members 25. The springs 28 are normally only sufficiently compressed to hold the rollers 13 lightly locked in the tapered portion of the raceway. It will thus be apparent that by reason of the construction shown, counterclockwise displacement of the roller release block 24 from the locked equilibrium position shown in Fig. 1 toward the unlocked position shown in Fig. 4 will move the left-hand roller counterclockwise as viewed in Fig. 1 against the resistance of the left-hand spring 28 and along the raceway out of jamming engagement with the wedge block 16 and the shaft 1, thereby to permit the arm 10 to be moved counterclockwise on the shaft 1 as to the position shown in Fig. 4. Upon removal of the displacement force applied to the release block, the left-hand spring 28 acting through its keeper member 25 will operate to restore the left-hand roller to its equilibrium jamming position as in Fig. 1. Obviously, a corresponding action will take place upon clockwise displacement of the roller release block coacting with the right-hand roller and spring, to permit of clockwise angular displacement of the arm 10. It will be noted, however, that in the equilibrium position the system formed by each coil spring 28 and the keeper 25 associated therewith is characterized by an absence of free mass so that harmonic response of this system to those frequencies which correspond to their own natural fundamental and/or harmonic frequencies, is wholly avoided. The roller release block 24, though capable of limited movement between the rollers 13 is not combined with an elastic member, so that it is not susceptible to being set into harmonic vibratory response to external frequencies and thereby release the jamming rollers.

The outer faces of the rims 17 and 18 of the collar 15 are engaged by the anti-friction and sealing gaskets 11 and 12, respectively, so that the collar 15 is held firmly against axial displacement while being relatively freely rotatable on the shaft 1.

The roller release block 24 is slotted as at 30 from top to bottom to receive an end of the clutch release lever 36 which latter extends through an aligned slot 31 of somewhat greater arcuate dimension, in the wedge block 16.

A push rod operating member 32 is disposed at one end within the collar 15 between the rims 17 and 18 to which it is secured by means of bolts 33 and receives the key pin 27 within its confines so that the spacer block 26, collar 15 and member 32 may rotate as a unit on the shaft 1. To the same end, the wedge block 16 is secured as by bolts 34, to the collar 15. The member 32 extends radially outwardly of the shaft 1 and, as shown, has its free-end pin-connected to a push rod 35 by which angular displacement of the arm 10 may be transmitted in obvious manner to the throttle, flap or other member to be positionally set and releasably locked in the set position.

The arm 10 as here preferably embodied is of built-up construction to provide a hollow handle portion within whose confines the lock release lever 36 is pivotally mounted. To this end, side plates 37 each having at one end an enlarged arcuate end portion 38 extend radially outwardly from opposite sides of the wedge block 16 which is circumferentially recessed to receive the end portions between it and the opposing rim portions 17 and 18 of the collar 15. The bolts 34 serve to secure the side plates fixedly in position.

Spacing blocks 38a disposed between the side plates 37 serve to maintain the latter in uniformly spaced parallel relation outwardly from the collar 15, the plates and blocks being secured together as by means of rivets 39. Closure strips 40 secured to the blocks 38a as by means of screws 41 complete the closure except at the outer extremity of the handle portion which is left open to receive a lock release lever actuating member 42.

The lock release lever 36 is journalled midway of its ends on a fixed bearing 43 which is secured between the side plates 37 by screws 44.

Thus, the lever 36 is adapted for limited angular movement on the bearing 43 in either a clockwise or counterclockwise direction, as viewed in Fig. 1. The upper end of the lever 36 is slotted as at 44a to receive a pin 45 carried by the actuating member 42. The latter in turn is journalled for pivotal movement on a bearing 45b secured between the side plates 37 by screws 45c. Thus, counterclockwise movement of the actuating member 42, as viewed in Fig. 1, as to the position shown in Fig. 4 will effect a clockwise movement of the lock release lever 36 to the position shown in Fig. 4, and vice versa. Advantageously, the actuating lever 42 may be provided with a knob 45d for convenience of the operator.

Magnetic means are provided for holding the clutch release lever 36 in its normal neutral position, as in Fig. 1, by the coercive force of the magnetic field of the magnetic means, against displacement tending to result from the application of random external vibratory forces thereto, whereby the clutch release member 36 is displaceable only on the application thereto of an external displacement force of determined magnitude and direction. Moreover, the magnetic means also serves to restore the clutch release lever to an equilibrium neutral position, when displaced therefrom. The magnetic means as here preferably embodied comprises a pair of magnet supporting arms 46 each pivotally mounted on a pivot pin 47 for limited angular movement within the confines of the hollow handle portion of the arm 10. Each of the arms 46 is provided with a toothed portion 48 operatively engaging the correspondingly toothed portion of the other so that angular movement of one will produce an equal but opposite angular movement of the other.

A pair of permanent horseshoe magnets 49 is carried by the arms 46, each arm serving to support one of the magnets which are disposed with the poles of one in opposing abutting relation to the unlike poles of the other so as to form a ring surrounding the clutch release lever 36 below the pivot pin 43. Each magnet is preferably slidably received within an undercut recess in its supporting arm 46 and is locked therein by means of a set screw 50.

A pair of set screws 51 each provided with a locking nut 52 is adjustably threadedly received in the arms 46, one to each arm, and in axially aligned relation with each other so as to engage or substantially to engage the lever 36 at opposite edges and thereby to hold the latter releasably against pivotal movement on the pivot pin 43. The magnets 49 and, hence, the arms 46 and set screws 51 are normally releasably held in an equilibrium neutral position as shown in Fig. 1 by the powerful coercive force of the magnetic fiields of the respective magnets acting on each other. In turn, the arms 46 acting through the set screws 51, hold the lock release lever 36 in its equilibrium neutral position, the coercive force of the magnetic fiields being sufficient to resist any tendency of the lock release lever toward displacement under the action of random external vibratory forces. Angular displacement of the lock release lever about the pivot pin 43 will result in the lever imparting a turning movement to the arms 46 through one or the other of the set screws 51 depending on the direction of displacement of the lever. Thus, if the left-hand set screw as viewed in Fig. 1 be engaged, the left-hand arm 46 will be moved clockwise so as to impart an equal, but counterclockwise, movement to the other through the action of the toothed arm portions 48. This movement is powerfully resisted by the coercive action of the fields of the respective magnets so that immediately upon release of the displacement force of determined magnitude and direction, the magnts will return to their equilibrium neutral position and in doing so restore the lock release lever to the same position. Moreover, there can be no vibratory motion imparted to the lock release lever in this return movement for there can be no overshooting of the equilibrium neutral position by the magnets in their return movement.

The inner end of the lock release lever extends through the slot 31 in the wedge block 16 into the slot 30 in the roller release block 24. The slot 31 is suitably dimensioned so as not to be engaged by the lever in its maximum displaced position. The slot 30, however, substantially closely confines the lever end so that angular displacement of the lever 36 is followed by immediate or substantially immediate displacement of the roller release block toward one or the other of the rollers 13, as the case may be.

In the operation of the embodiment shown in Fig. 1, and assuming the arm 10 to be in the set position shown, pressure of determined magnitude applied by hand to the knob 45d is a direction toward the left as viewed in Fig. 1 will cause the actuating lever 42 to pivot to the position shown in Fig. 4. This pivotal movement is applied to the clutch release lever 36 through the pin 45 to cause the lever 36 to take the position shown in Fig. 4. The lever 36 in taking this position comes immediately into contact with the left-hand set screw 51 forcing it and the left-hand magnet support arm 46 and its magnet 49 outwardly to the position shown in Fig. 4. This outward movement is accompanied by an equal and opposite outward movement of the right-hand magnet 49 as shown in Fig. 4. Under these conditions the magnets 49 are seeking to restore the lever 36 to its equilibrium neutral position. The displacement of the lock release lever 36 simultaneously effects a displacement of the roller release block 24 as viewed in Fig. 4 into contact with the left-hand roller 13. This roller and its companion right-hand roller in the equilibrium neutral position thereof as in Fig. 1 are wedged between the stationary sleeve 1 and the wedge block 16 in the tapered portions of the raceway 14. In this position, the arm 10 is locked to the sleeve 1 and any turning moment applied to the arm only tends more firmly to lock the one to the other. The displacement of the roller release block as to the position shown in Fig. 4 moves the left-hand roller 13 out of jamming engagement along the raceway 14 against the resistance offered by the left-hand coil spring 28. The arm 10 is now free to turn on the sleeve 1 since counter-clockwise movement of the arm, as viewed in Fig. 4, completely frees the right-hand roller 13. So long as pressure is applied to the arm 10 through the knob 45d, the locking rollers will be maintained in released condition and the arm will continue to move to the left as shown in Fig. 4. This motion is transmitted through the lever actuating arm 32 to the push rod 35, which in turn is moved to the right for positionally adjusting the throttle valve, flap, or other member to which it is connected.

Upon release of the pressure applied to the knob 45d, the coercive force of the magnetic fields of the two magnets 49 draws them together and restores the lock release lever to its equilibrium neutral position wherein the arm 10 and shaft 1 are again locked against rotation by the rollers 13.

It will be apparent that the farther apart the magnets 49 are spaced by the displacement action of the clutch release lever 36, the less powerful will be their mutual attraction for each other. In the event that their displacement is beyond the limit of their effective operating range, ancillary means energized by displacement of the lock release member must be relied on to initiate and maintain the return movement of the lock release lever until the coercive force of the magnetic fields can take over and complete the return movement within the effective range of operation. In the embodiment of this invention shown in Figs. 1 to 8, inclusive, whichever coil spring 28 is compressed serves this function by urging the clutch release lever toward the equilibrium position through the medium of the roller keeper 25 and roller 13 acting on the roller release block 24 and through it on the lever 36. Under the conditions shown in Fig. 4, the left-hand coil spring 28 may be thus operative.

Referring now to the embodiment of this invention shown in Figs. 9 to 13, inclusive, a number of toothed quadrant members 55 are fixedly mounted in aligned relation on a common supporting shaft 56 which may be fixedly secured as at one end by suitable means (not shown) to a supporting structure (not shown) such as a control panel or frame structure of an aircraft. A corresponding number of levers 57 are also mounted on the shaft 56 for angular clockwise and counter-clockwise movement thereon relative to the fixed quadrant members 55, on a common journal axis corresponding to the cylinder axis of the shaft 56. Three such quadrant members are depicted in Fig. 11 each associated with one such lever in, identical sets, but it will be understood that only one, or as many of such sets as may be required, may be mounted on the shaft. In Fig. 11 only the left-hand, or first, set is shown in full lines while the second and third sets have the quadrant of each depicted in full lines and the lever and certain other parts of each depicted in outline form by dash-dot lines, for clarity. Each set is adapted for the control of a separate positionable adjustable member such, for example, as a throttle valve, flap, serve control lever, etc. and it is contemplated that they may be mounted in banks of any desired number on a control panel. The following description is directed in the main only to one set, the others being identical.

The lever 57 extends above and below the shaft 56 and is adapted to be pin-connected at its lower end to a push rod 58 as by pivot pin 59, Fig. 9.

Means are provided for releasably clutching the lever 57 to the quadrant 55. As here preferably embodied, a clutch release lever 60 is disposed between the quadrant 55 and the lever 57 to which latter it is pivotally connected by a threaded pivot pin 61 which carries, and is secured by, a nut 62. The lever 60 is apertured adjacent its lower end, as viewed in Fig. 9, to provide a transverse slot 63 through which a tubular spacer collar 64, extends.

The spacer collar 64 is of cylindrical configuration, is internally threaded and has an annular flange portion 65 at one end, as best seen in Fig. 12. The opposite end of the collar abuts the front face of the lever 57 against which it is firmly secured by a stud bolt 66 passing through the lever 57 into threaded engagement with the collar 64 internally thereof. The slot 63 is suitably dimensioned with relation to the collar 64 to permit the lock release lever 60 to be moved a limited angular amount in either direction of rotation on the pivot pin 61 before the collar is engaged by the lever 60 at either end of the slot 63.

A pair of lock pawls 67 and 68, respectively, are disposed, one in front of the other, at the flanged end of the collar 64 where they are supported pivotally for angular movement in either direction of rotation on a common axis corresponding to the cylinder axis of the collar 64, by a stud 69 on which they are journalled and which is received within and threadedly engages the collar 64. The pawls 67 and 68 extend in opposite directions generally radially outwardly of the stud 69 and terminate each at its outer end in an upwardly extending V-shaped toe 70. Each toe 70 is normally seated in one or another of a series of complemental ratchet notches 71 in the toothed arcuate ratchet portion 72 of the quadrant 55. To this end, the pawl 68 is suitably offset intermediate its ends so that its toe 70 and the toe 70 of the pawl 67 will lie in substantially the same vertical plane, as is best seen in Fig. 12. Each pawl terminates at its inner end in a heel 73 which extends radially downwardly relative to the stud 69 and in diverging relation to the other heel 73.

A coil spring 74 coaxial with the stud 69 is disposed between the pawls 67 and 68 and serves the dual function of holding the pawls apart on the stud 69 each in proper position for easy entry of its toe into the ratchet notches 71 and of maintaining each toe 70 in firm, but releasable locking engagement with the ratchet portion 72. To this end, the respective opposite ends of the coil spring 74 are disposed in hooked engagement with the respective heels 73 of the pawls and in such fashion as to urge the pawls 67 and 68 in a clockwise and counterclockwise direction, respectively, as viewed in Fig. 9.

In order that angular movement of the clutch lever 60 from an equilibrium neutral position such as in Fig. 9, may be utilized to disengage the pawls and permit angular movement of the lever 57, the lock release lever is provided with a pawl actuating pin 75 extending forwardly from the lever and disposed to be centrally between and in spaced relation to the pawl heels 73, in the equilibrium neutral position of the latter as in Fig. 9. Thus, angular movement of the lock release lever in a counterclockwise direction, as viewed in Fig. 9, will have no immediate effect on the pawls. However, after a given angular movement, the pawl actuating pin 75 will come in contact with the heel 73 of the pawl 67 and, with continued movement, cause the latter to rotate counterclockwise around the stud 69 against the resistance offered by the spring 74 until the toe 70 of the pawl disengages from the ratchet portion 72. Manifestly, the toe 70 of the opposite pawl 68 will then be free to move, ratchet fashion, along the ratchet teeth 71 toward the left as viewed in Figs. 9 and 10. It will also be apparent that the coil spring 74 will continuously tend to urge the pawls 67 and 68 and the clutch release lever toward an equilibrium position upon removal of the pawl displacement force.

Magnetic means are provided, however, for normally restoring the lock release lever to a neutral equilibrium position and for holding the lock release lever in that position by the coercive force of the magnetic field of said means. The magnetic means as embodied here comprises a permanent horseshoe magnet 76 which is yieldably mounted for pivotal movement on the lever 57 in aligned relation therewith and with the clutch release lever 60 so as to present its unlike poles 77 and 78, respectively, to and in spring-pressed engagement with a metal pole piece 79 which advantageously is detachably secured to the lever 60 by means of the pawl actuating pin 75.

The magnet 76 being of extremely hard and not readily workable metal is fashioned to provide a tongue portion 80 disposed to overlap a complementary tongue 81 of a bifurcated mounting block 82 of more workable metal to which the magnet proper is secured releasably without compressive stress by a stud 83 threadedly engaging the tongue 81. The stud 83 traverses the interpole space 84 of the magnet and is advantageously provided with a collar 85 which is dimensioned snugly to fill the interpole space 84 at the bottom thereof and to project slightly out from the magnet face so as to be engaged frictionally by the head of the securing stud 83, whereby the magnet is secured, but not compressed.

The mounting block 82 straddles and slidably pivotally engages a threaded pivot pin 86 carried by the lever 57 and secured thereto by a nut 87. A spring 88 under compression is disposed in the yoke slot 89 of the magnet mounting block and bears at one end against the pivot pin 86 and at the other end against the mounting block at the base of the yoke slot. The mounting block 82 with its attached magnet 76 is thus slidably movable as well as pivotally movable on the pivot pin 86. Hence, angular displacement of the lock release lever 60 on its pivot pin 61 as from the position shown in Fig. 9 toward the position shown in Fig. 10 will cause an equal and opposite angular deflection of the magnet 76 about the pivot pin 86. Manifestly, the turning of the magnet is accompanied by a downward movement of the magnet on its pivot pin since the pivot pins 61 and 86 are fixed.

It will be apparent that the magnet and its pole piece 79 are in line contact at one pair of corresponding edges during angular rotation. In order to preserve this relationship and prevent slippage of one on the other, the pole piece carries a guide pin 90 which threadedly engages the pole piece 79 and extends into the interpole slot 84 and is suitably contoured to permit of the desired relative movement of magnet and pole piece within a restricted arcuate path.

The lever 57 and the quadrant members 55 in their mounting on the shaft 56 are spaced suitably from each other thereon by a series of spacing collars 91 and are held against axial displacement by a fastening nut 92 threadedly engaging the shaft 56. Advantageously, the quadrants 55 are ganged together and suitably spaced from each other at their upper end by a series of spacing collars 93 and tie bolts 94. The lock release lever 60 may be provided with a suitable hand grip such as the ball fitting 95 for the convenience of the operator.

In the operation of the embodiment of this invention shown in Figs. 9–13, inclusive, the lever 57 may obviously be moved in either a clockwise or counterclockwise direction on the shaft 56 from a neutral equilibrium position. Illustratively, in order to reflect movement from a position such as is shown in Fig. 9 toward the position shown in Fig. 10, the operator may manually apply pressure of determined magnitude to the knob 95 in a direction toward the left as viewed in Fig. 9. The resultant counterclockwise movement of the lock release lever 60 on the pin 61 will be transmitted through the pole piece 79 to the magnet 76 and initiate its displacement toward the position shown in Fig. 10. The coercive force of the magnetic field of the magnet will powerfully oppose this movement such that if the displacement force be removed, the lock release lever will be restored to a normal equilibrium position with the pole piece in contact with both poles of the magnet.

The initial movement of the lock release lever will not operate to release the left-hand pawl 67 from its locking engagement with the ratchet portion 72. However, the pawl actuating pin 75 will ultimately come into contact with the heel of pawl 67 and rotate the pawl and toe 70 thereof out of the notch 71 in which it is lodged. The right-hand pawl 68 is now free to ratchet along the ratchet portion 72 toward a new position toward which it is shown to be moving in Fig. 10. The angular movement of the lock release lever about pin 61 is limited by the pawl pin collar 64 and the length of slot 63. When collar 64 is engaged by the slot end, the lever 57 will be moved counterclockwise on shaft 56, as viewed in Fig. 10. When the displacement force is removed, the magnet will return the lock release lever to the neutral equilibrium position and there will be no possibility of the system being unlocked by the application of random external vibratory forces. The device is entirely free of any system of elastic members and free masses to enter into harmonic response to those frequencies in random vibrations which correspond to their own natural fundamental and/or harmonic frequencies, with inevitable failure at this point of the locking mechanism to maintain the given setting.

In the event that the magnet 76 be moved angularly about the pivot pin 86 to a position which is beyond the limit of the range within which the coercive force of the magnetic field is in itself sufficient to restore the magnet and the lock release lever in turn to an equilibrium neutral position, then the restorative action of the spring 88 together with that of the pawl spring 74 will suffice to effect the return of the magnet and lever within the range over which the coercive force of the magnetic field is sufficient to complete the return and again lock the lever 60 in the new position.

Referring now more particularly to the embodiment of this invention as depicted in Figs. 14 to 18, inclusive, a lever 100 is pivotally mounted on a fixed stub shaft 101 for clockwise and counterclockwise movement thereon. A push rod 102, pin-connected to the bottom end of the lever, is movable thereby for positionally adjusting a control member (not shown) such as a throttle valve, flap, pitch control, or the like. A quadrant member 103 is mounted on the shaft 101 in coaxial relation to the lever 100 and is secured against angular movement on the shaft by bolts 104. The latter are advantageously provided each with a spacing collar 105 serving to space the control device from a like unit (not shown) on the shaft 101 when several such units are arranged in banks for convenience. The shaft 101 is secured in convenient fashion to a relatively fixed structure such as the frame or control panel of the aircraft or other structure in which it is installed.

A set of pins 106 and 107 each preferably of cylindrical contour affixed to the lever 100 extends forwardly therefrom into fixed engagement with a member 108 which in turn is carried pivotally by the shaft 101. The lever 100 and member 108 are additionally secured together in fixed spaced parallel relation axially of the shaft 101 by means of a spacing collar 109 and securing screws 110 threadedly engaging the latter. Thus, the lever 100 and member 108 together form an integral structure angularly displaceable about the shaft 101.

The pins 106 and 107 are disposed one above the other below the arcuate portion 111 of the quadrant member 103, with their cylinder axes parallel to each other and to the cylinder axis of the shaft 101. Thus, as the lever 100 is angularly displaced, the pins 106 and 107 will follow separate arcuate paths concentric with the face of an arcuate track portion 111.

A lock release lever 112 extends into the space between the lever 100 and arm 108 with both of which it is normally longitudinally parallel. The lever 112 is longitudinally slotted to provide therein a narrow pin slot 113 traversed by the pins 106 and 107. The pin slot 113 is of a length to permit a limited extent of movement in the plane of the axes of the pins 106 and 107. It is also of a uniform width to permit a limited extent of movement at right angles to the said plane. Both ends of the slot are preferably of cylindrical contour. It will be apparent that the lever 112 though "free floating" and capable of movement lengthwise and transversely of the slot axes is also capable of being rocked into engagement with the pins 106 and 107 so as angularly to displace the lever 100 on shaft 101 upon continued application of an external force of determined magnitude and direction.

Magnetic means are provided for releasably locking the lever 100 to the quadrant 103. The embodied locking means comprises a permanent horseshoe magnet assembly 114 which is removably affixed to the lock release lever 112 by means of a stud screw 115 and is disposed and arranged beneath the arcuate track portion 111, between the lever 112 and arm 108 so as to receive the pins 106 and 107 in the space 116 between magnet arms 117 and 118 with the pole ends of each arm held firmly in frictional engagement with the opposing face of the arcuate track portion 111 by the coercive force of the magnetic field of the magnet acting through the member 111 on a pole piece 128 also engaging the track portion 111. Advantageously, the arms 117 and 118 of the magnet assembly 114 are separate bar magnets which are assembled to have their unlike poles paired as corresponding ends. One pair of such ends is permanently connected by a soft iron pole piece 119 having a spacer portion 120 extending into the space 116 between the magnets to maintain the magnet arms in determined spaced relation to each other. A pin 120' traversing the magnet arms and the spacer portion 120 serves to secure these members together. Bolts 121 traversing the magnet arms 117 and 118 and threadedly engaging the lock release lever 112, serve to secure the magnet assembly removably to the latter.

The pole faces 122 and 123 of the magnet arms 117 and 118, respectively are each of cylindrical contour matching the contour of the quadrant track which they engage. The space 116 between the magnet arms is dimensioned such that in an equilibrium neutral position of the magnet, as in Fig. 17, the magnet arms just touch the pivot pin 106 at diametrically opposite points. This spacing is maintained from substantially the pole faces to a suitable point below the pivot pin 106 but above the lever pin 107 where the spacing is increased to that of the slot 113 sufficiently to permit of a limited pivotal movement of the magnet assembly on the pin 106 before the magnet assembly is caused to bear on the lever pin 107. By this arrangement, the magnet assembly can be moved into a declutched position as in Fig. 15 before the lever 100 is forced into movement.

To this end, therefore, each of the magnet arms 117 and 118 is provided with a roller 125, each of the rollers 125 being journalled for rotation in a recess 126 on a shaft 127 carried by the magnet arm. The rollers 125 are symmetrically disposed with reference to the vertical plane of symmetry of the magnet assembly as viewed in Fig. 17, which plane corresponds to the common axial plane of the cylinder axes of the pins 106 and 107 and of the shaft 101.

The rollers 125 are each of a diameter such that in the equilibrium position of the magnet assembly 114 as in Fig. 17, the roller is very slightly spaced from the track surface 124 which it is adapted to engage and travel upon. Thus, this spacing ensures that the pole surfaces 122 and 123 of the magnet assembly will closely frictionally engage the surface 124 which may be of soft brass, and thus normally be held securely against translation relative thereto. However, a slight tilt of the magnet assembly on the pivot pin fulcrum 106 by the application of an external force thereto through the medium of the lock release lever 112 will cause one or the other of the magnet rollers 125 to come promptly into contact with the quadrant surface 124 and result in the magnet assembly being thereafter fulcrumed on the surface 124 by the contacting roller 125. The movement of the magnet assembly on the pivot pin 106 thereafter will be a compound movement of sliding translation and rotation until the limit of movement is reached when one or the other of the magnet arms, as well as the lever 100, comes into contact with the lever pin 107. Thereafter, the roller 125 (right or left as the case may be) will roll freely along the surface 124 with the pole faces 122 and 123 entirely out of contact with the quadrant surface 124. The lever 100 is naturally caused to move angularly on the shaft 101 relative to the fixed quadrant 103 to the limit of its movement, or until the displacement force is relieved.

Upon release of the displacement force, as with the parts in the position shown in Fig. 15, the coercive force of the magnetic field of the magnet assembly 114 acting through the non-magnetic track portion 111 upon the pole piece 128 will powerfully urge the magnet assembly back into its normal equilibrium position as in Fig. 17. At the same time, the lever 112 will be returned therewith and the system will be securely locked frictionally against displacement. External vibratory forces will have no unlocking or "creeping" effect since there is no system of free mass and spring pressed means to be set into harmonic response.

The pole piece 128 is fashioned of material such as iron or steel providing a flux path for the magnetic lines of force from pole to pole. The member 128 will be drawn powerfully by the magnet assembly against the quadrant track 111 which is thus gripped and clamped by and between the magnet and its pole piece. The latter is provided with a shoe portion 129 of a contour to match the configuration of the track portion 111. Arms 130 and 131 extending parallelly outwardly from the shoe portion 129 form a yoke slot 132 through which a pivot pin 133 extends into threaded engagement with the lock release lever 112. A collar 134 positioned around the pin 133 between the yoke arms and the lever serves to maintain the pole piece in fixed spaced relation to the lever 112. An upstanding arcuate flange 135 on the quadrant track 111 serves as a spacing guide for the shoe portion.

A coil spring 136 disposed in the yoke slot 132 bears at one end against the pivot pin 133 and at the other end against the pole piece, but exerts no axial pressure against the pole piece in its normal equilibrium position. A pin 137 affixed to the pole piece extends axially of the spring and serves to retain the spring in the slot.

It will be apparent that a movement of the clutch release lever 112 from a neutral equilibrium position as in Fig. 14 toward a position as in Fig. 15 will produce relative pivotal and translational movement between the lever 112 and the pole piece 128 on the axis of pivot pin 133 resulting in compression of the coil spring 136. The energy thus stored tends to restore the lever 112 toward an equilibrium neutral position and, in the event the magnet assembly 114 has been displaced to a position outside the range where the coercive force of the magnetic field of the magnet is alone sufficient to return the lever 112 to the equilibrium position, the spring 136 will serve to return the magnet to a position within its effective operating range.

The lever 112 may be provided with a knob 138 for the convenience of the user. Also, collars 139 are provided on the shaft 101 for suitably spacing the lever 100, quadrant 103, and arm 108 from one another and from adjacent like units in a bank of such units if such be employed. A nut 140 on the shaft 101 serves to retain the shaft mounted elements in their assembled relationship thereon.

The invention in its broader aspects is not limited to the specific embodiment shown and described but departure may be made therefrom within the scope of the accompanying claims without departing from the principles of the invention and without sacrificing its chief advantage.

What is claimed is:

1. The device comprising the combination with separate members mounted for relative movement of: means for releasably locking said members together against relative movement, a said locking means comprising a lock release member mounted on one of said separate members for displacement relative thereto in opposite directions between a selected neutral equilibrium position in which said separate members are locked together and a displaced position in which said separate members are unlocked and are relatively movable, and magnetic means pivotally mounted on one of said separate members for restoring said lock release member to said selected neutral position when displaced therefrom, said lock release member being normally held in said selected neutral position by the coercive force of the magnetic field of said magnetic means against displacement tending to result from the application of random external vibratory forces thereto, whereby said lock release member is displaceable only on the application thereto of an external displacement force of determined magnitude and direction.

2. The device of claim 1 including means energized by displacement of said lock release member for returning the latter to a position within the range where the coercive force of the magnetic field alone is capable of completing the restoration.

3. The device of claim 1 in which said separate members are mounted for relative angular movement on a common axis.

4. The device of claim 1 in which said lock release member is pivotally mounted on said one member.

5. The device of claim 1 in which said lock release member is pivotally slidably mounted on said one member.

6. The device of claim 1 in which said magnetic means comprises a permanent magnet.

7. The device of claim 1 in which said magnetic means comprises separate permanent magnets having the poles of one in opposing relation to the unlike poles of another.

8. The device of claim 7 in which said permanent magnets are each pivotally supported on separate axes on said one member.

9. The device of claim 7 in which said permanent magnets are mechanically coupled for simultaneous and equal angular displacement in opposite directions upon angular displacement of one.

10. The device of claim 8 in which said lock release member is pivotally mounted on said one member with its pivot axis parallel to the pivot axes of said magnets, whereby angular displacement of said lock release member in either direction of pivoting may effect angular displacement of said magnets against the coercive force of their magnetic field.

11. The device of claim 1 in which said lock release member is pivotally mounted on said one member and in which said magnetic means comprises separate permanent magnets each having its pole disposed in juxtaposed relation to the unlike poles of another, separate support arms for the respective magnets, each yieldably mounted on said one member for displacement by said lock release member against the coercive force of the magnetic fields of said magnets.

12. The device of claim 11 in which said support arms are pivotally mounted on said one member and in which said lock release member extends between the pivot-axes of said arms, whereby angular displacement of said lock release member will effect angular displacement of said arm against the coercive force of the magnetic field of said magnets.

13. The device of claim 1 in which said magnetic means comprises a permanent magnet element and a pole piece element, said elements being mounted for relative movement effected by said lock release member.

14. The device of claim 13 in which said pole piece element is stationary and in which said permanent magnet element is movable.

15. The device of claim 13 in which both said permanent magnet element and said pole piece element are movable.

16. The device of claim 15 in which said lock release member also serves as said pole piece element.

17. A device in accordance with claim 1 in which said magnet and said lock release member form an integral unit and in which supplemental restorer means is mounted on said lock release member in slidable spring-pressed engagement with said other member and in opposing relation to said magnet for returning said magnet and said lock release member as a unit to a position within that range where magnetic coercion alone is capable of completing restoration of said unit to the said neutral position.

18. A device in accordance with claim 1 in which said magnetic means comprises a permanent magnet pivotally mounted on said one member and in which said lock release member also serves as a pole piece for said magnet, said lock release member having means including a spring-present restorer member, normally releasably locking said lock release member to said other member.

19. The device comprising a relatively fixed shaft; an arm journalled on said shaft; spring-pressed roller locking means between said arm and said shaft; a lock release lever pivotally mounted in said arm, a separate lever pivotally mounted on said arm for actuating said lock release lever; and, separate permanent magnets pivotally mounted on said arm at opposite sides of said lock release lever and with unlike poles in opposing relation, said lock release lever being normally held in a selected neutral position by the coercive force of said magnets.

20. The device comprising a relatively fixed toothed quadrant, a radial arm coaxially journalled to said quadrant, a permanent magnet pivotally slidably mounted on said arm, a slotted lock release lever pivotally mounted on said arm and forming a pole piece for said magnet; and, spring pressed pawls slidably mounted in the slot of said lever and normally locking said lock release lever to said toothed quadrant.

21. The device comprising a relatively fixed quadrant, a radial arm coaxially journalled to said quadrant; a horseshoe magnet slidably pivotally secured between its poles to said arm with its poles adhering to said quadrant; anti-friction bearings carried by said magnet, said bearings being symmetrically disposed on said magnet at opposite sides of its pivotal axis and, in closely spaced relation to said quadrant; a lock release arm integral with said magnet and extending radially outwardly from said quadrant; and, a spring pressed restorer member slidably pivotally mounted on said lock release arm and frictionally engaging said quadrant opposite said magnet.

FERDINAND A. DE WIESS.

REFERENCES CITED

The following references are of record in the file of this patent:

UNITED STATES PATENTS

| Number | Name | Date |
|---|---|---|
| 298,749 | Hall | May 20, 1884 |
| 588,372 | Parsons | Aug. 24, 1897 |
| 686,372 | Waterman | Nov. 12, 1901 |
| 1,211,550 | Cuff | Jan. 9, 1917 |
| 1,647,654 | Nicholson | Nov. 1, 1927 |
| 2,288,688 | Dubilier | July 7, 1942 |